United States Patent
Fullerton

(10) Patent No.: US 6,587,227 B1
(45) Date of Patent: Jul. 1, 2003

(54) COPIER HAVING CONTOURED TRACK GUIDES

(75) Inventor: Jack K. Fullerton, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/457,820

(22) Filed: Dec. 9, 1999

(51) Int. Cl.$^7$ .......................... H04N 1/04; G03G 15/00; G03G 15/30; G03B 27/32
(52) U.S. Cl. ................. 358/474; 399/362; 399/379; 399/380; 399/211; 355/25
(58) Field of Search ................. 399/362, 379, 399/380, 211; 355/25; 358/474

(56) References Cited

U.S. PATENT DOCUMENTS

| | | | | |
|---|---|---|---|---|
| 4,980,720 A | * | 12/1990 | Siegel | 399/52 |
| 5,012,275 A | | 4/1991 | Bock | 355/25 |
| 5,276,530 A | * | 1/1994 | Siegel | 358/406 |
| 5,712,718 A | * | 1/1998 | Chen | 359/201 |
| 5,726,775 A | * | 3/1998 | Walsh | 358/488 |
| 5,801,849 A | * | 9/1998 | Soloveychik et al. | 358/474 |

OTHER PUBLICATIONS

USSN 09/459,309; filed Dec. 10, 1999, by Joseph P. Taille, entitled Scanner Having a Variable Object Plane.

* cited by examiner

Primary Examiner—Edward Coles
Assistant Examiner—Houshang Safaipour
(74) Attorney, Agent, or Firm—David E Henn; John M. Kelly

(57) ABSTRACT

An input scanner for scanning three-dimensional objects, such as books, on a platen. An elongated raster scanner produces a digital representation of a line image in an object plane that is a fixed distance in front of the raster scanner's input optics. When scanning the three-dimensional object the raster scanner travels along a track guide that is contoured in the Z-direction. That contour is designed to mimic the contour of the three-dimensional object being scanned. When traveling along the track guide the distance between the three-dimensional object and the object plane remains substantially constant.

15 Claims, 4 Drawing Sheets

COPIER HAVING CONTOURED TRACK GUIDES

This patent application relates to U.S. patent application Ser. No. 09/459,309, filed on Dec. 10, 1999 by Joseph P. Taille, entitled, "SCANNER HAVING A VARLABLE OBJECT PLANE;" the disclosure of which is incorporated by reference.

FIELD OF THE INVENTION

This invention relates to scanning nonplanar originals, such as bound books or other three dimensional objects.

BACKGROUND OF THE INVENTION

Input scanners are widely used for producing digital versions of images on substrates. Digital versions are beneficial because they can be stored, processed, transmitted, and subsequently used by other devices, such as computers, copiers, and facsimile machines.

Input scanners usually include a flat, transparent platen that supports a substrate having an image that is to be digitized, and a moving raster scanner having a light source that radiates a narrow "scan line" of light through the platen and onto the substrate. Part of that light is reflected by the image on the substrate and collected and focused by the raster scanner's input optics onto an elongated light sensor array. The light sensor then converts its received light into digital signals that are then stored. As the raster scanner moves across the substrate the scan line of light sweeps over the substrate and other scan lines are digitized. When the substrate's image has been completely scanned the digital signals of all of the scan lines represent a digital version of the image.

Scanning three-dimensional (non-planar) substrates such as bound books presents problems. One set of problems relates to keeping the object plane of the light into the sensor array on the three-dimensional object as the raster scanner moves. For example, when scanning a book the book's pages near the binding tends to become defocused as the pages lift off the platen. Even relatively minor variations between a three-dimensional object and the object plane can cause serious problems. For example, some input scanners that use gradient index lens arrays can become significantly defocused by a separation of as little as 1 millimeter.

Various approaches have been taken in the prior art to reduce the problems related to scanning three-dimensional objects. With books, one approach is to use "brute force" to press the book against the platen, thereby reducing the book's lift. However, portions of the book's pages still remain above the platen's surface. Moreover, pressing a book against a flat platen can degrade the book's binding, especially with older books. Another approach is to use a wedged platen to reduce binding degradation. However, wedged platens tend to reduce overall machine utility and increase cost.

Other approaches are described in U.S. Pat. No. 5,276,530, which issued on Jan. 4, 1994, and which is entitled "Document reproduction machine with electronically enhanced book copying capability." That patent mentions a reproduction machine having a height sensor on a scanner that determines the distance between a reference point (which may be in the object plane) and the original being scanned. The height information is used to control the position of a scanning mirror that adjusts the focus, illumination, and scan rate. Furthermore, U.S. Pat. No. 5,276,530 teaches using information from a height sensor as an input to an electronic correction circuit that electronically corrects for defocusing caused by height variations. However, the incorporation of a height sensor adds cost and complexity. Therefore, a new approach to copying three-dimensional objects on a flat platen would be beneficial.

SUMMARY OF THE INVENTION

The principles of the present invention provide for improved scanning of a three-dimensional object placed on a platen. An input scanner according to the principles of the present invention includes a platen for locating a three-dimensional object that is to be scanned, a contoured track guide adjacent the platen, and a moving raster scanner that moves along the track guide and across the platen. The raster scanner includes a light source that produces a scan line of light, an elongated light sensor array for digitizing received light, and input optics that focuses light reflected from an object plane onto the light sensor array. The raster scanner produces a digital representation of a line image having an object plane that is a fixed distance in front of the raster scanner's input optics. The contour of the track guide adjusts the spatial position of the raster scanner, and thus the spatial position of the object plane, in the Z-direction as the raster scanner moves such that the three-dimensional object tends to remain in focus. Beneficially, the track guide is a feature of the platen itself.

If the three-dimensional object being scanned is a book, the contour of the track guide is such that it approximates the contour of the book's binding.

BRIEF DESCRIPTION OF THE DRAWINGS

Other aspects of the present invention will become apparent as the following description proceeds and upon reference to.

DETAILED DESCRIPTION OF A PREFERRED EMBODIMENT OF THE INVENTION

Figure 1:
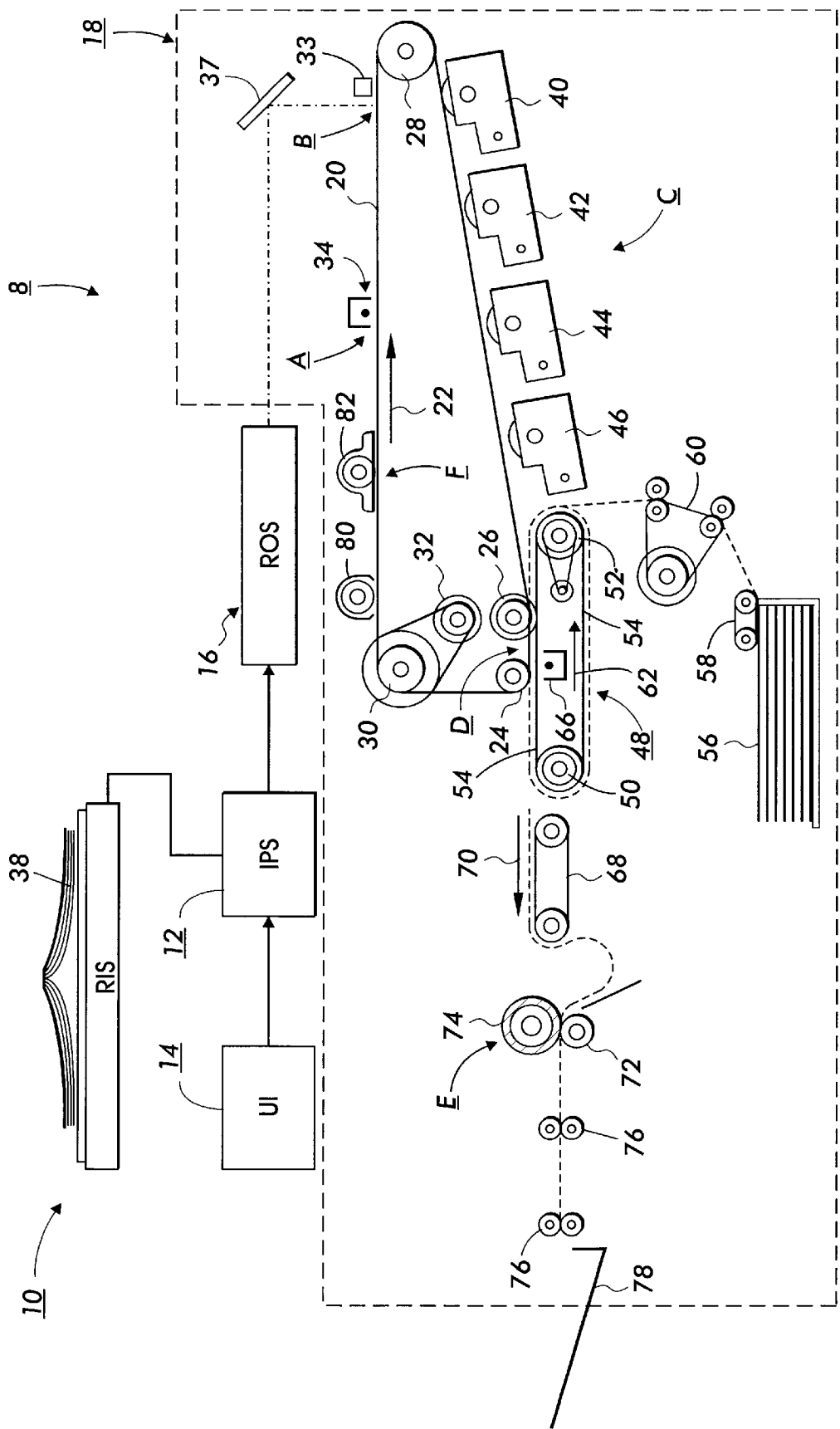
FIG. 1, which schematically illustrates an electrophotographic printing machine that incorporates the principles of the present invention.

Referring now to FIG. 1, a preferred embodiment of the present invention is incorporated into a digital, full color, electrophotographic printing machine 8 that is capable of copying three-dimensional objects. It will become evident from the following discussion that the principles of the present invention are wellsuited for use in other systems, specifically including stand-alone input scanners and facsimile machines. Therefore, the present invention is not limited to the printing machine 8.

To initiate copying a multicolor, three-dimensional object 38 is positioned on an input scanner, indicated generally by the reference numeral 10. The input scanner 10 includes a platen, illumination lamps, focusing optics, a scanning drive that is selectively adjustable to scan either flat or three-dimensional objects, and an elongated sensor array in the form of a charge coupled device (CCD array). As the principles of the present invention are closely related to the input scanner, that scanner is described in more detail subsequently. The input scanner 10 converts the image on the object 38 into a series of raster scan lines comprised of sets of primary color densities, such as red, green and blue.

The sets of primary color densities are transmitted as electrical signals to an image processing system (IPS) 12, which converts those sets into sets of colorimetric coordinates that are more suitable for printing. Basically, the primary color densities are derived from additive colors (red, green and blue) while electrophotographic printing is usually performed using subtractive colors (cyan, magenta, and yellow) and black. The image processing system also contains control electronics for preparing and managing the image data flow to a raster output scanner (ROS) 16 that includes a laser source and optical systems.

A user interface (UI) 14 provides a method for an operator to communicate with the image processing system 12. The user interface 14 enables an operator to actuate appropriate input keys to implement operator adjustable copy parameters. In particular, an operator could select a special "book mode" feature to set up the printer 8 to perform book copying. The user interface 14 may be a touch screen, push buttons, or any other suitable input device. The output signals from the user interface 14 are transmitted to the image processing system 12, which then implements the user initiated copy parameters. The image processing system then transmits the electrical signals that correspond to the desired image to the raster output scanner 16. Those electrical signals are comprised of four subimages, one that represents the black component of the desired image, another that represents the cyan component, another that represents the magenta component, and another that represents the yellow component. In response, the raster output scanner 16 modulates its laser beam according to those components.

The printing machine 8 also includes a printer 18. The printer 18 includes a photoconductive belt 20 that is entrained about transfer rollers 24 and 26, a tensioning roller 28, and a drive roller 30. The drive roller 30 is rotated by a motor (or other suitable mechanism that is not shown) via a belt drive 32. As the drive roller 30 rotates, it advances the photoconductive belt 20 in the direction 22 to sequentially advance successive portions of the photoconductive belt 20 through the various processing stations disposed about that belt.

Initially, the photoconductive belt 20 sequentially passes through a charging station, indicated generally by the reference letter A. At the charging station A, a corona generator 34 generates ions via corona discharge that charge the photoconductive belt 20 to a relatively high, substantially uniform voltage potential.

Next, the charged photoconductive belt sequentially advances past an exposure station, indicated generally by the reference letter B. The exposure station B receives a modulated laser beam from the raster output scanner. The modulated laser beam is a sweeping beam that exposes, via a mirror 37, the photoconductive belt 20 so as to record four separate color latent images. A black latent image represents the black component of the desired image, a cyan latent image represents the cyan component, a magenta latent image represents the magenta component, and a yellow latent image represents the yellow component.

After an electrostatic latent image has been recorded on the photoconductive belt 20, that latent image is advanced toward a development station, indicated generally by the reference letter C. The development station C includes four individual developer units indicated by reference numerals 40, 42, 44 and 46. The developer units are of a type generally referred to in the art as "magnetic brush developers." A magnetic brush developer employs a magnetizable developer material including magnetic carrier granules that have triboelectrically adhering toner particles. The toner is continually brought through a directional flux field to form a toner brush. Development is achieved by bringing the brush of developer material into contact with the latent image bearing surface of the photoconductive belt. The developer 46 deposits black toner onto the black latent image, the developer 44 deposits cyan toner onto the cyan latent image, the developer 42 deposits magenta toner onto the magenta latent image, and the developer 40 deposits yellow toner onto the yellow latent image. Great care is taken to ensure that only toner particles of the correct color are deposited on the appropriate latent images.

After development, the toner images are moved to a transfer station, indicated generally by the reference letter D. Transfer station D includes a transfer zone, defining the position at which the toner image is transferred onto a substrate, such as a sheet of paper A substrate transport, indicated generally by the reference numeral 48, moves the substrate into contact with photoconductive belt 20. The substrate transport 48 has a belt 54 entrained about a pair of substantially cylindrical rollers 50 and 52. A friction retard feeder 58 advances the uppermost substrate from a stack 56 onto a pre-transfer transport 60. The pre-transfer transport synchronizes the advancement of a substrate onto the substrate transport such that the leading edge of the substrate arrives at the transfer zone such that the black toner image is properly positioned adjacent the substrate.

In the transfer zone a corona generating device 66 sprays ions onto the backside of the substrate so as to charge the substrate to the proper magnitude and polarity for attracting the toner from photoconductive belt 20 onto the substrate. After the black toner is transferred onto the substrate the substrate remains electrostatically secured to the belt 54 so as to move in a recirculating path in the direction 62 for three more cycles. The three remaining toner images are then transferred onto the substrate in superimposed registration with one another.

After all of the toner images are transferred onto the substrate the substrate is removed from the substrate transport system by a vacuum conveyor, indicated generally by the reference numeral 68. The vacuum conveyor advances the substrate in the direction 70 into a fusing station, indicated generally by the reference letter E. In the fusing station a heated fuser roll 74 and a pressure roll 72 permanently fuse the composite toner layer with the substrate. The substrate is then advanced by rolls 76 into a catch tray 78 for subsequent removal by an operator.

After the toner images are transferred onto the substrate, the photoreceptor belt advances in the direction 22 into a cleaning station, indicated generally by the reference letter F. There, a lamp 80 illuminates the surface of photoconductive belt 20 to remove any residual charge. Thereafter, a rotating fibrous brush 82 removes any residual toner particles, dust, and/or debris from the photoconductive belt in preparation for the start of the next printing cycle.

In addition to the elements described above, the printing machine 8 also includes a system controller that controls the overall operation of the printer, drive components, power supplies, and other subsystems to implement the copying and printing schemes described above.

Figure 2:
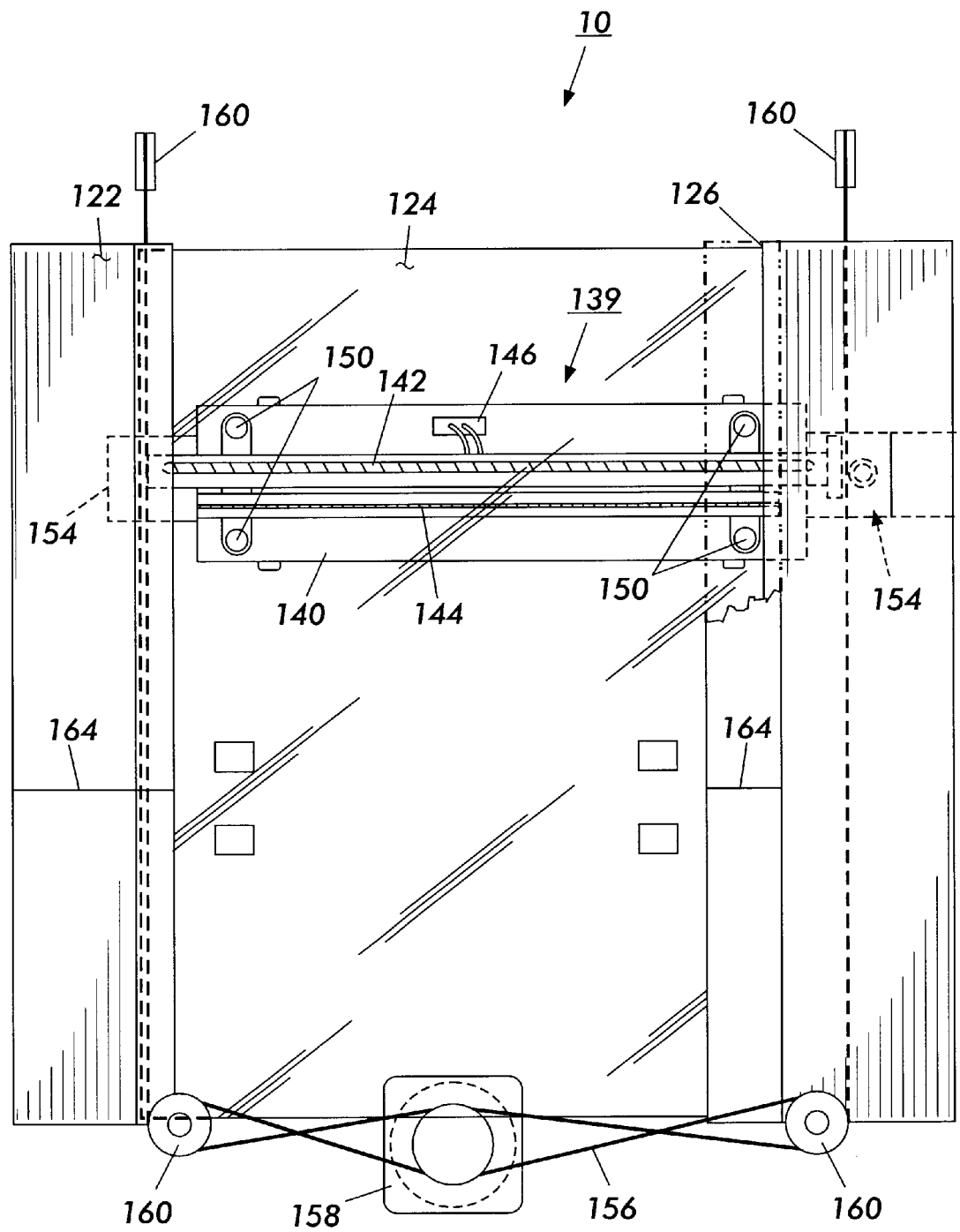
FIG. 2, which presents a top-down view of an input scanner used in the printing machine illustrated in FIG. 1.
Figure 3:
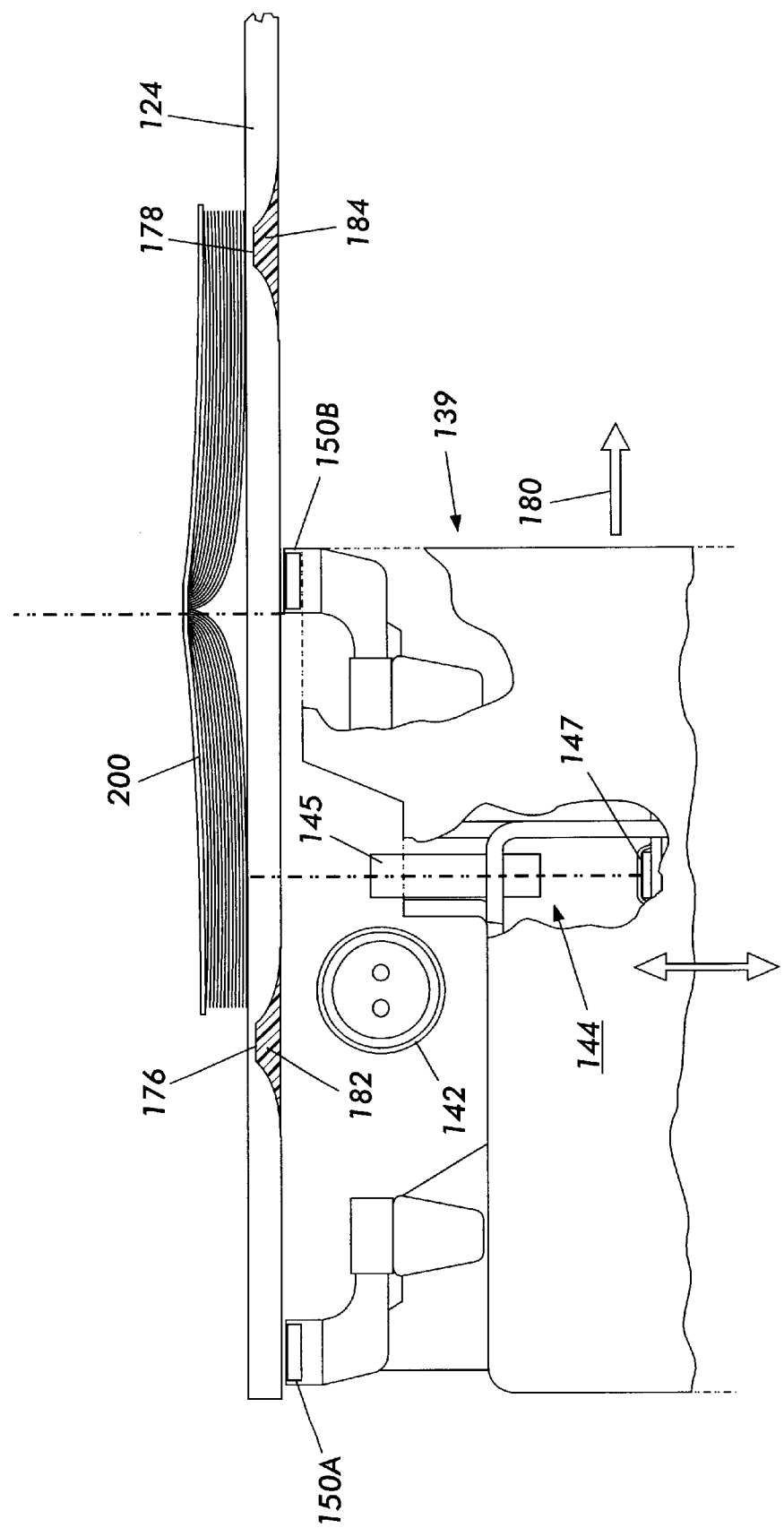
FIG. 3, which presents a simplified side-view of the input scanner illustrated in FIG. 2.

As previously mentioned the principles of the present invention are closely associated with the input scanner 10. FIGS. 2 and 3 show portions of the input scanner in more detail. The input scanner is comprised of a frame 122 onto which is firmly mounted a glass platen 124. The frame includes a document registration edge 126 that acts as a guide for locating flat documents. In practice the frame is beneficially made of either sheet metal or solid plastic. Below the platen 124 is a raster scanner 139 having a moving carriage assembly 140. In the moving carriage assembly is an elongated fluorescent lamp 142 that is housed in a frame with a narrow opening through which light illuminates objects on the platen. Turning now to FIG. 3, the raster scanner 139 further includes a photodetector assembly 144 having input optics 145 and an elongated light sensor array 147. That photodetector assembly digitizes scan line images from an object plane that is a fixed distance in front of the input optics.

Turning back to FIG. 2, the raster scanner 139 also includes a harness assembly 146 for supplying electrical power to the lamp 142 and to the photodetector assembly 144, and for transmitting the digitized representation of the object's image to other electronics subsystems. The harness assembly 146 is flexible and is located such that it does interfere with the motion of the moving carriage assembly. Beneficially, the interior of the frame that holds the fluorescent lamp is made of a light reflective material. Furthermore the photodetector assembly is beneficially substantially enclosed within a metallic shield so as to reduce electromagnetic interference.

Turning now to both FIGS. 2 and 3, to accurately locate the raster scanner 139, and thus the object plane of the photodetector assembly in the Z-direction (into and out plane of FIG. 3) the raster scanner includes buttons 150. In FIG. 3, two of those buttons are labeled 150A and 150B. While the raster scanner 139 uses four buttons, in practice three buttons (two buttons on one side of the moving carriage assembly and one button on the other side) is preferred in some applications. The tops of the buttons are located above the remainder of the raster scanner. Since the raster scanner is biased against the platen (in a manner that is not shown) the raster scanner 139 slides across the bottom of the platen (this is best illustrated in FIG. 3). The raster scanner is attached at each end by fasteners 154 to a moving cable 156 that is driven via a motor 158 along pulleys 160 such that the raster scanner moves back and forth across the platen.

The frame further includes registration marks 164. Those marks are used by an operator to locate a three-dimensional object that is to be scanned, such as a book, on the platen 124. For example, FIG. 3 shows a side view of a book 200 on the platen with the center of the book's binding aligned with the registration marks 164.

Figure 4:
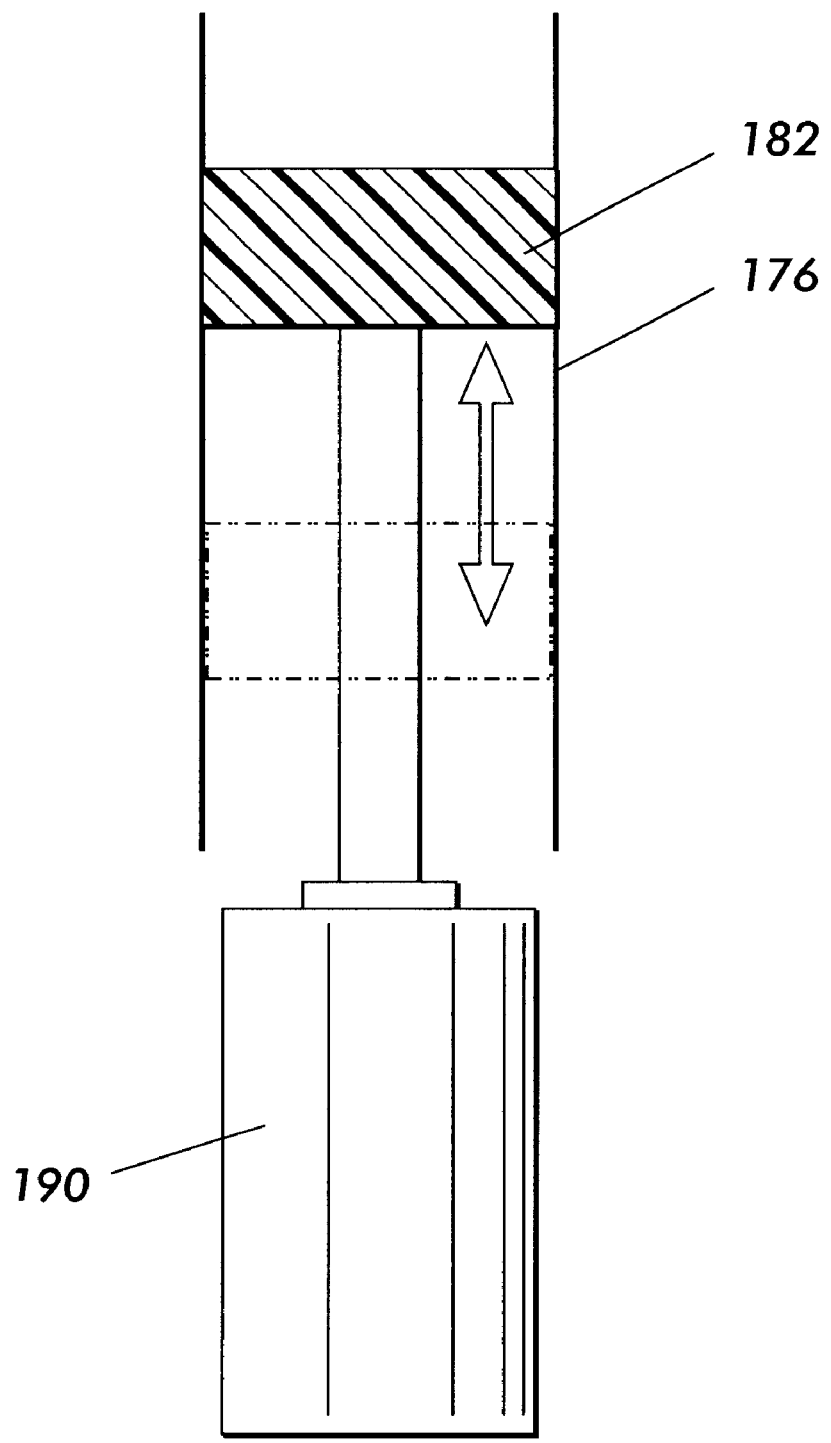
FIG. 4, which illustrates a solenoid selectively positioning inserts for the input scanner illustrated in FIGS. 2 and 3.

Referring now to FIG. 3, the platen 124 includes contoured track guides, the guides 176 and 178. Additionally, while not shown in the figures, two additional track guides are located for the other buttons 150. If a flat document is being scanned, inserts 182 and 184 are placed, respectively, at first positions in the guides 176 and 178. That flat document is placed against the document registration edge 126. FIG. 4 shows the insert 182 in the first position in solid, the other insert locations are similar. In their first positions the inserts 182 and 184 are located such that movement of the raster scanner in a direction 180 causes the button 150A to slide over the insert 182 and the button 150B to slide over the insert 184. Those inserts are designed such that they are flush with the bottom of the platen 124. Thus, when the raster scanner 139 moves from the left in a direction 180 the raster scanner sweeps across the flat document with an object plane that remains fixed in the Z-direction. Since the object plane is at the top of the platen the sweeping raster scanner produces a digital representation of the image on the document.

However, if the image of a three-dimensional object, such as the book 200, is to be copied the operator sets that object on the platen in alignment with the registration marks 164 and sets the printer in "book-mode" copying. The inserts are then initially placed in their fist positions in the track guides 176. Again, reference FIG. 4. When the raster scanner begins its sweep it is so far to the left (relative to FIG. 3) that the button 150B is to the left of the guide 176. At this time the object plane is still at the top of the platen. As the moving raster scanner sweeps across the platen it produces a digital representation of the image at the top of the platen.

Eventually the button 150B passes over the guide 176. All of the inserts are then moved to second positions in their track guides using solenoids or similar devices. FIG. 4 illustrates a bi-directional solenoid 190 that selectively moves insert 182 from its first position in track guide 176 (shown in solid lines) to its second position (shown in phantom). The other inserts (including the two at the opposite end of the raster scanner) have a similar movement arrangement.

After the inserts are moved to their second positions the raster scanner movement brings button 150A to track guide 176 and button 150B to track guide 178. Until this time the object plane has remained at the top of the platen. As the raster scanner continues its travel the buttons slide into their track guides. The raster scanner then follows the track guides and begins moving in the Z-direction closer to the top of the platen. The object plane follows this Z-direction motion. The contours of the track guides are designed to mimic the contour of the book 200. Therefore, the object plane remains on the image on the book despite the book's binding causing the book's pages to lift off of the platen. Eventually the buttons leave the track guides and the object plane is once again at the top of the platen. As raster scanner motion continues the button 150A eventually approaches track guide 178. At this time the inserts are once again moved to their first positions in the track guides. As the button 150A moves over the insert 184 the object plane remains at the top of the platen.

The contour of the track guides are significant. Ideally they should match the contour of the three-dimensional object being scanned. This enables a fixed optical system to successfully scan a three-dimensional object without adding significant cost or complexity to the input scanner. However, it is obviously not possible to completely match the contour of each book (let alone a random three-dimensional object) using track guides with a single contour. Various approaches can be taken to minimize differences between the contour of the three-dimensional object being scanned and the contour of the track guide. First, an "average" contour of possible three-dimensional objects can be used. For example, if most books being scanned are 300 pages then the track guides could be given the contour of the center of a 300 page book. Another alternative is to use "tweaking" inserts. Such inserts could be inserted into the track guides to provide a modified track guide.

It is to be understood that while the figures and the above description illustrate the present invention, they are exemplary only. Others who are skilled in the applicable arts will recognize numerous modifications and adaptations of the illustrated embodiments that will remain within the principles of the present invention. For example, other implementations of the present invention include selectively sliding a movable track under the moving carriage or using a moving carriage that is selectively slide over a fixed track. Therefore, the present invention is to be limited only by the appended claims.

What is claimed:

1. An input scanner, comprising:
 a platen for holding an object having an image and a contour at least partially at the top of the platen;
 a raster scanner adjacent said platen, said raster scanner having a light source that emits a line of light through said platen and toward an object plane, a sensor array, and input optics for focusing light from said object plane onto said sensor array, wherein said raster scanner produces a digital representation of the image, on the object;
 a motion producer for moving said raster scanner relative to said platen such that said line of light scans across said platen; and
 a track guide for positioning said moving raster scanner such that said object plane tracks said contour along the top of the platen and, when the contour includes a portion away from the top of the platen, said object plane tracks said portion away from the top of the platen.

2. The input scanner according to claim 1, wherein the object is a bound, open book and wherein the contour is that of the book lying on said platen.

3. The input scanner according to claim 2, wherein the object is a three-dimensional object and the track guide positions the raster scanner such that the object plane follows the contour of the three-dimensional object.

4. The input scanner according to claim 1, wherein said track guide is an integral part of said platen.

5. An input scanner for scanning either a flat or a three-dimensional object having a contour, comprising:
 a platen;
 a track guide having a contour;
 a movable insert fitting into said contour;
 a motion inducing mechanism for selecting positioning said insert either at a first position or at a second position;
 a raster scanner adjacent said platen, said raster scanner having a moving carriage holding a light source that emits a line of light through said platen and toward an object plane, a sensor array, and input optics for focusing light from said object plane onto said sensor array, wherein said raster scanner produces a digital representation of the image at the object plane, and wherein said moving carriage includes a plurality of slide members; and
 a motion producer for moving said raster scanner across said platen such that said line of light scans across said platen and such that said slide members travel along said track guide;
 wherein said track guide cooperates with said slide members such that said object plane tracks the contour of a three-dimensional object on said platen when said insert is at said second position, and wherein said insert cooperates with said slide members such that said object plane travels on a fixed plane when said inserts are at said first position.

6. An input scanner according to claim 5, wherein said track guide is comprised of two contoured, elongated paths.

7. An input scanner according to claim 5, wherein said track guide is integral with said platen.

8. An input scanner according to claim 5, further including a controller having a user input, said controller for causing said motion inducing mechanism to selectively position said insert at said second position.

9. The input scanner according to claim 5, wherein the three-dimensional object is a book.

10. A printer, comprising:
 an input scanner having:
 a platen;
 a track guide with a contour;
 a movable insert fitting into said contour;
 a motion inducing mechanism receiving position signals, said motion inducing mechanism for selecting positioning said insert either at a first position or at a second position in response to said position signals;
 a raster scanner adjacent said platen, said raster scanner having a moving carriage holding a light source that emits a line of light through said platen and toward an object plane, a sensor array, and input optics for focusing light from said object plane onto said sensor array, wherein said raster scanner produces a digital representation of the image at the object plane, and wherein said moving carriage includes a plurality of slide members; and
 a motion producer for moving said raster scanner across said platen such that said line of light scans across said platen and such that said slide members travel along said track guide;
 wherein said track guide cooperates with said slide members such that said object plane tracks the contour of a three-dimensional object on said platen when said insert is at said second position, and wherein said insert cooperates with said slide members such that said object plane travels on a fixed plane when said inserts are at said first position;
 a controller having a user interface that selects three-dimensional copying, said controller for producing position signals that cause said motion inducing mechanism to position said insert at a second position in response to a selection of three-dimensional copying, said controller further for receiving said digital representation of the image at the object plane and for producing video signals that represent an image to be printed; and
 a printer for printing the image represented by said video signals.

11. A printer according to claim 10, wherein said track guide is comprised of two contoured, elongated paths.

12. A printer according to claim 10, wherein said track guide is integral with said platen.

13. A printer according to claim 10, wherein the three-dimensional object is a book.

14. A printer according to claim 10, wherein said printer is an electrophotographic printer.

15. A printer according to claim 14, wherein said printer is a color electrophotographic printer.

* * * * *